United States Patent [19]
Glanville

[11] Patent Number: 5,758,599
[45] Date of Patent: Jun. 2, 1998

[54] ANTI-TIPPING WATER DISH FOR PETS

[76] Inventor: Jerold N. Glanville, 4010 Higuera Rd., San Jose, Calif. 95148

[21] Appl. No.: 831,900

[22] Filed: Apr. 3, 1997

[51] Int. Cl.⁶ ..................................................... A01K 7/00
[52] U.S. Cl. ............................................................ 119/77
[58] Field of Search ................................... 119/51.5, 77

[56] References Cited

U.S. PATENT DOCUMENTS

| | | | |
|---|---|---|---|
| 101,766 | 4/1870 | Richardson | 119/51.5 |
| 1,094,755 | 4/1914 | Smith | 119/77 |
| 1,234,054 | 7/1917 | McCandlish | 119/61 |
| 3,749,063 | 7/1973 | Buffum | 119/61 |
| 5,207,182 | 5/1993 | Lorenzana | 119/77 |

*Primary Examiner*—Robert P. Swiatek

[57] ABSTRACT

An anti-tipping water dish for pets including a base member having a recess formed therein. The recess has an aperture extending therethrough adjacent to a lower surface thereof. The base member has a threaded aperture extending downwardly therethrough. The threaded aperture is adapted for removably coupling with a threaded opening of a bottle of water. An interior channel is disposed within the base member. The interior channel has an upper end that is contiguous with the threaded aperture and a lower end that is contiguous with the aperture in the recess. The interior channel transports water from the bottle into the recess for consumption by the pet.

5 Claims, 2 Drawing Sheets

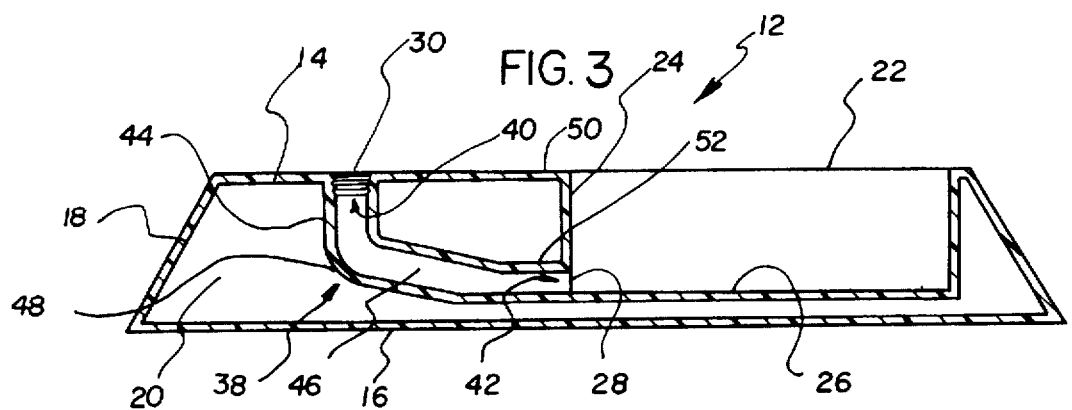
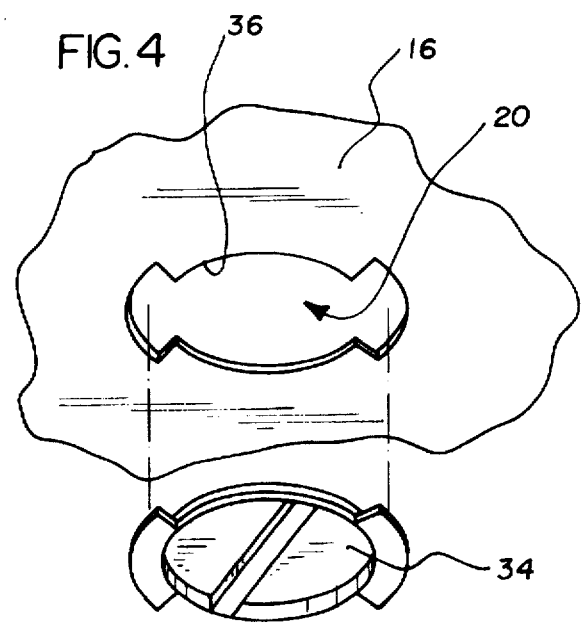

ANTI-TIPPING WATER DISH FOR PETS

BACKGROUND OF THE INVENTION

1. Field of the Invention

The present invention relates to an anti-tipping water dish for pets and more particularly pertains to coupling with a water bottle for providing a water supply with an anti-tipping water dish for pets.

2. Description of the Prior Art

The use of pet feeder and waterers is known in the prior art. More specifically, pet feeder and waterers heretofore devised and utilized for the purpose of providing food and water for pets are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,573,434 to Gardner discloses a pet watering apparatus.

U.S. Pat. No. 5,259,336 to Clark discloses a combined automatic pet waterer and feeder.

U.S. Pat. No. 5,140,945 to Barnhart et al. discloses a disposable feed and water dispenser.

U.S. Pat. No. 5,000,123 to Morse et al. discloses an animal food dish construction.

U.S. Pat. No. 4,831,798 to Otteson discloses a ground anchoring stake.

U.S. Pat. No. Des. 350,842 to VanSkiver discloses the ornamental design for a pet waterer.

While these devices fulfill their respective, particular objective and requirements, the aforementioned patents do not describe an anti-tipping water dish for pets for coupling with a water bottle for providing a water supply.

In this respect, the anti-tipping water dish for pets according to the present invention substantially departs from the conventional concepts and designs of the prior art, and in doing so provides an apparatus primarily developed for the purpose of coupling with a water bottle for providing a water supply.

Therefore, it can be appreciated that there exists a continuing need for new and improved anti-tipping water dish for pets which can be used for coupling with a water bottle for providing a water supply. In this regard, the present invention substantially fulfills this need.

SUMMARY OF THE INVENTION

In the view of the foregoing disadvantages inherent in the known types of pet feeder and waterers now present in the prior art, the present invention provides an improved anti-tipping water dish for pets. As such, the general purpose of the present invention, which will be described subsequently in greater detail, is to provide a new and improved anti-tipping water dish for pets and method which has all the advantages of the prior art and none of the disadvantages.

To attain this, the present invention essentially comprises a base member having a generally trapezoidal configuration. The base member has a planar top surface, a planar bottom surface, side walls therebetween and a hollow interior. The side walls angle inwardly from the bottom surface to the top surface. The top surface has a square recess formed therein. The recess is defined by upwardly extending walls and a planar lower surface. An innermost of the walls of the recess has an aperture extending therethrough adjacent to the lower surface. The top surface has a threaded aperture extending downwardly thereof. The threaded aperture is adapted for removably coupling with a threaded opening of a bottle of water. The bottom surface of the base member has a removable cap coupleable with an aperture therethrough. The aperture extends into the hollow interior of the base member. The hollow interior is adapted to hold sand therein. An interior channel is disposed within the hollow interior of the base member. The interior channel has an upper end that is contiguous with the threaded aperture and a lower end that is contiguous with the aperture in the innermost wall of the recess. A pair of tabs extend outwardly from opposing sides of the bottom surface of the base member. Each of the tabs has an aperture therethrough. Two pairs of engaging brackets are secured to opposing side walls of the base member. A pair of spikes selectively extend through the apertures in the pair of tabs and into a recipient surface for securement of the base member in an in use orientation. The pair of spikes are selectively engaged within the pairs of engaging brackets when not in use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved anti-tipping water dish for pets which has all the advantages of the prior art pet feeder and waterers and none of the disadvantages.

It is another object of the present invention to provide a new and improved anti-tipping water dish for pets which may be easily and efficiently manufactured and marketed.

It is a further object of the present invention to provide a new and improved anti-tipping water dish for pets which is of durable and reliable construction.

An even further object of the present invention is to provide a new and improved anti-tipping water dish for pets which is susceptible of a low cost of manufacture with regard to both materials and labor, and which accordingly is then susceptible of low prices of sale to the consuming public, thereby making such an anti-tipping water dish for pets economically available to the buying public.

Even still another object of the present invention is to provide a new and improved anti-tipping water dish for pets for coupling with a water bottle for providing a water supply.

Lastly, it is an object of the present invention to provide a new and improved anti-tipping water dish for pets including a base member having a recess formed therein. The recess has an aperture extending therethrough adjacent to a lower surface thereof. The base member has a threaded aperture extending downwardly therethrough. The threaded aperture is adapted for removably coupling with a threaded opening of a bottle of water. An interior channel is disposed within the base member. The interior channel has an upper end that is contiguous with the threaded aperture and a lower end that is contiguous with the aperture in the recess.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view as taken along line 3—3 of FIG. 1.

FIG. 4 is a cross-sectional view as taken along line 4—4 of FIG. 2.

The same reference numerals refer to the same parts through the various figures.

DESCRIPTION OF THE PREFERRED EMBODIMENT

Figure 1:
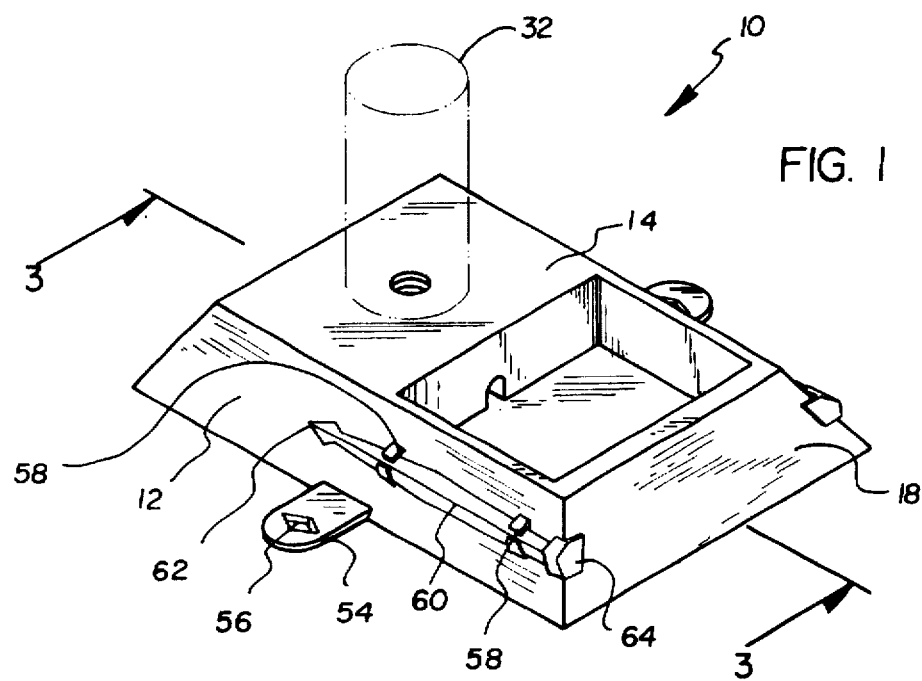
FIG. 1 is a perspective view of the preferred embodiment of the anti-tipping water dish for pets constructed in accordance with the principles of the present invention.
Figure 2:
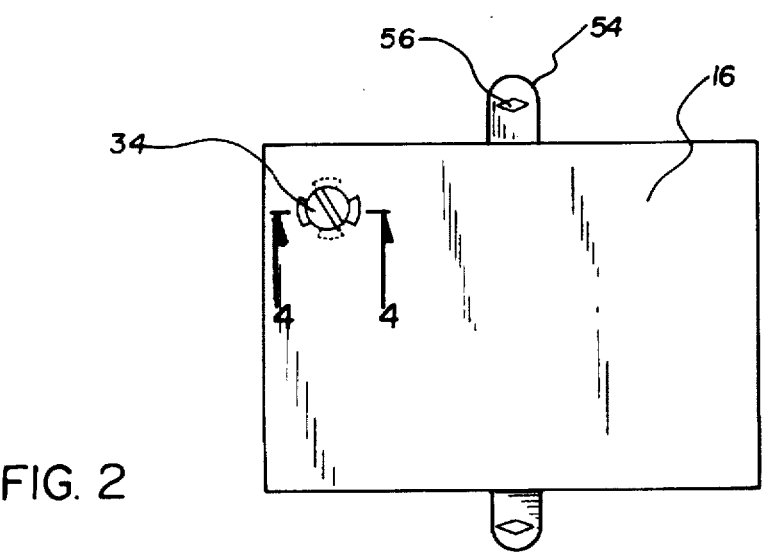
FIG. 2 is a bottom view of the preferred embodiment of the present invention.

With reference now to the drawings, and in particular, to FIGS. 1 through 4 thereof, the preferred embodiment of the new and improved anti-tipping water dish for pets embodying the principles and concepts of the present invention and generally designated by the reference number 10 will be described.

Specifically, it will be noted in the various Figures that the device relates to a anti-tipping water dish for pets for coupling with a water bottle for providing a water supply. In its broadest context, the device consists of a base member, an interior channel, a pair of tabs, two pairs of engaging brackets and a pair of spikes. Such components are individually configured and correlated with respect to each other so as to attain the desired objective.

The device 10 includes a base member 12 having a generally trapezoidal configuration. The base member has a planar top surface 14, a planar bottom surface 16, side walls 18 therebetween and a hollow interior 20. The side walls angle inwardly from the bottom surface to the top surface. The bottom surface has a greater area than the lower surface to help prevent the base member from being tipped over during use. The top surface has a square recess 22 formed therein. Alternate shapes of the recess could also be used in alternate embodiments of the device. The recess is defined by upwardly extending walls 24 and a planar lower surface 26. An innermost of the walls of the recess has an aperture 28 extending therethrough adjacent to the lower surface. The height of the aperture is about ½ the height of the recess. The top surface has a threaded aperture 30 extending downwardly thereof. The threaded aperture is adapted for removably coupling with a threaded opening of a bottle of water 32. Note FIG. 1. The bottom surface of the base member has a removable cap 34 coupleable with an aperture 36 therethrough. The aperture extends into the hollow interior of the base member. The hollow interior is adapted to hold sand therein. The cap can be removed, as in FIG. 4, to allow for sand to be added to or removed from the base member.

An interior channel 38 is disposed within the hollow interior of the base member. The interior channel has an upper end 40 that is contiguous with the threaded aperture and a lower end 42 that is contiguous with the aperture in the innermost wall of the recess. The interior channel has a short upper portion 44 and a longer lower portion 46 with a bend 48 disposed therebetween. The short upper portion is vertically oriented while the longer lower portion is horizontally oriented. The longer lower portion has an interior portion 50 that is slightly angled downwardly and an exterior portion 52 that is essentially parallel with the lower surface of the base member.

A pair of tabs 54 extend outwardly from opposing sides of the bottom surface of the base member. Each of the tabs has an aperture 56 therethrough.

Two pairs of engaging brackets 58 are secured to opposing side walls of the base member. The engaging brackets are resilient to allow for easy manipulation. This function will be referenced in the forthcoming paragraph.

A pair of spikes 60 selectively extends through the apertures in the pair of tabs and into a recipient surface for securement of the base member in an in use orientation. Each of the spikes have sharpened lower ends 62 for easy inserting into a ground area and enlarged upper ends 64 for use with a hammer. The pair of spikes are selectively engaged within the pairs of engaging brackets when not in use. The brackets can be manipulated to allow the spikes to be inserted.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An anti-tipping water dish for pets for coupling with a water bottle for providing a water supply comprising, in combination:

a base member having a generally trapezoidal configuration, the base member having a planar top surface, a planar bottom surface, side walls therebetween and a hollow interior, the side walls angling inwardly from the bottom surface to the top surface, the top surface having a square recess formed therein, the recess being defined by upwardly extending walls and a planar lower surface, an innermost of the walls of the recess having an aperture extending therethrough adjacent to the lower surface, the top surface having a threaded aperture extending downwardly thereof, the threaded aperture adapted for removably coupling with a threaded opening of a bottle of water, the bottom surface of the base member having a removable cap coupleable with an aperture therethrough, the aperture extending into the hollow interior of the base member, the hollow interior adapted to hold sand therein;

an interior channel disposed within the hollow interior of the base member, the interior channel having an upper end contiguous with the threaded aperture and a lower end contiguous with the aperture in the innermost wall of the recess;

a pair of tabs extending outwardly from opposing sides of the bottom surface of the base member, each of the tabs having an aperture therethrough;

two pairs of engaging brackets secured to opposing side walls of the base member; and a pair of spikes selectively extending through the apertures in the pair of tabs and into a recipient surface for securement of the base member in an in use orientation, the pair of spikes selectively engaged within the pairs of engaging brackets when not in use.

2. An anti-tipping water dish for pets for coupling with a water bottle for providing a water supply comprising, in combination:

a base member having a planar top surface, a planar bottom surface, side walls therebetween and a hollow interior space, the base member further having a tubular recess formed in the interior space thereof, the recess having an aperture extending therethrough adjacent to a lower surface thereof, the base member having a threaded aperture extending downwardly therethrough, the threaded aperture adapted for removably coupling with a threaded opening of a bottle of water;

an interior channel disposed within the base member, the interior channel having an upper end contiguous with the threaded aperture and a lower end contiguous with the aperture in the recess; and means for securement of the base member to a recipient surface.

3. The anti-tipping water dish for pets as set forth in claim 2 wherein the means for securement comprising sand disposed within the base member.

4. The anti-tipping water dish as set forth in claim 2 wherein the means for securement comprising a pair of tabs extending outwardly from opposing sides of a bottom surface of the base member, each of the tabs having an aperture therethrough for receiving a spike therethrough for securement to the recipient surface.

5. The anti-tipping water dish as set forth in claim 4 and further including two pairs of engaging brackets secured to opposing side walls of the base member for receiving the spikes when not in use.

* * * * *